(12) United States Patent
Ronda et al.

(10) Patent No.: US 8,337,034 B2
(45) Date of Patent: Dec. 25, 2012

(54) ILLUMINATION DEVICE

(75) Inventors: Cornelis Reinder Ronda, Aachen (DE); Hugo Johan Cornelissen, Waalre (NL); Yadong Liu, Shanghai (CN); Xiaoyan Zhu, Shanghai (CN); Bo Liu, Shanghai (CN); Kairaz Sarosh Contractor, Shanghai (CN); Marcellinus Petrus Carolus Michael Krijn, Eindhoven (NL); Hendrikus Albertus Adrianus Maria De Ruijter, Shanghai (CN); Theodorus Johannes Petrus Van Den Biggelaar, Veldhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 651 days.

(21) Appl. No.: 12/522,740

(22) PCT Filed: Jan. 16, 2008

(86) PCT No.: PCT/IB2008/050139
§ 371 (c)(1),
(2), (4) Date: Jul. 10, 2009

(87) PCT Pub. No.: WO2008/087593
PCT Pub. Date: Jul. 24, 2008

(65) Prior Publication Data
US 2010/0296264 A1    Nov. 25, 2010

(30) Foreign Application Priority Data

Jan. 19, 2007 (EP) .................................. 07100817
Oct. 5, 2007 (EP) .................................. 07117975
Dec. 5, 2007 (EP) .................................. 07122374

(51) Int. Cl.
*F21V 33/00* (2006.01)
(52) U.S. Cl. .......... 362/99; 359/803; 362/183; 362/577; 362/582; 362/602; 362/603
(58) Field of Classification Search ............. 362/98, 362/99, 183, 577, 582, 602, 603; 359/803
See application file for complete search history.

(56) References Cited

U.S. PATENT DOCUMENTS

| 4,816,970 | A | 3/1989 | Garcia |
| 5,050,946 | A | 9/1991 | Hathaway et al. |
| 5,485,291 | A | 1/1996 | Qiao et al. |
| 5,803,572 | A | 9/1998 | Brada |
| 6,104,857 | A | 8/2000 | Ishiharada et al. |
| 6,130,730 | A | 10/2000 | Jannson et al. |
| 6,139,163 | A | 10/2000 | Satoh et al. |
| 6,612,713 | B1 | 9/2003 | Kuelbs |

(Continued)

FOREIGN PATENT DOCUMENTS

AU      7346281 A1    1/1982

(Continued)

*Primary Examiner* — Stephen F Husar
(74) *Attorney, Agent, or Firm* — John F. Salazar; Mark L. Beloborodov

(57) ABSTRACT

The invention relates to an illumination device (10) for illuminating a surface, with a lighting element (20) and an illuminating body (30), wherein the lighting element (20) emits an artificial light (21,21'), a housing element (40) comprises the lighting element (20) and supports the illuminating body (30), the illuminating body (30) comprises a transparent light conductive material and is generally overlying the surface, being illuminated. The invention discloses, that the illuminating body (30) comprises a light extraction layer (50), configured to receive and to deflect the artificial light (21,21') from the lighting element (20) onto the surface.

12 Claims, 10 Drawing Sheets

| U.S. PATENT DOCUMENTS | | | | FOREIGN PATENT DOCUMENTS | | |
|---|---|---|---|---|---|---|
| 6,951,403 B2 | 10/2005 | Bennett | | DE | 10261543 A1 | 7/2004 |
| 7,139,136 B2 * | 11/2006 | Waggoner et al. ............ 359/803 | | DE | 202006011055 U1 | 11/2006 |
| 2003/0063459 A1 | 4/2003 | McChesney | | WO | 0184042 A1 | 11/2001 |
| 2004/0212985 A1 | 10/2004 | Travis | | WO | 2005096856 A1 | 10/2005 |
| 2005/0185398 A1 | 8/2005 | Scannell | | | | |
| 2005/0213226 A1 | 9/2005 | Waggoner et al. | | | | |

* cited by examiner

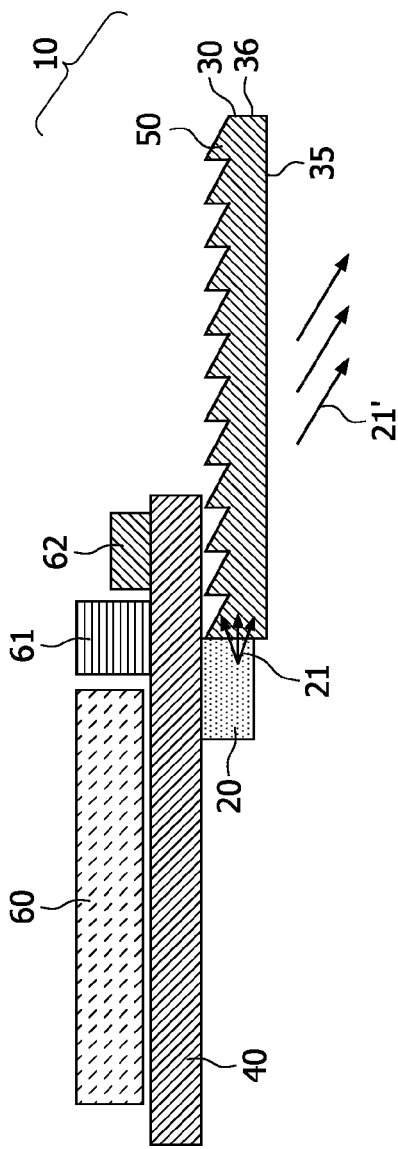
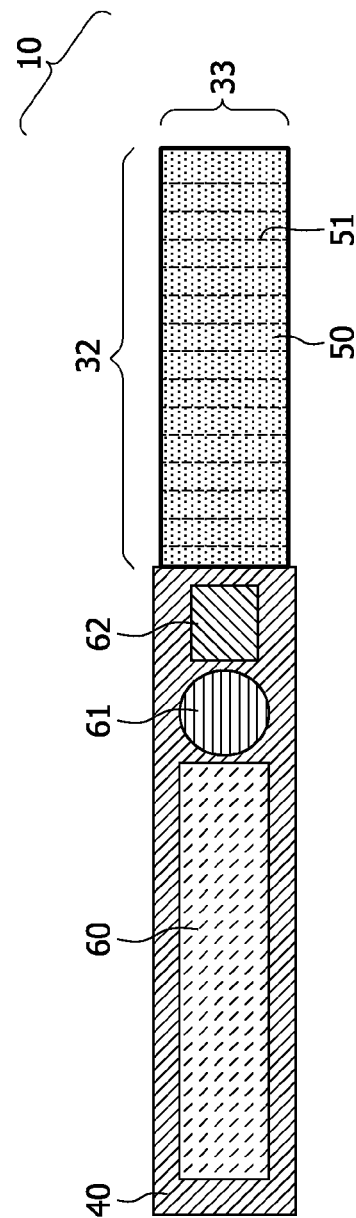
FIG. 1
FIG. 2

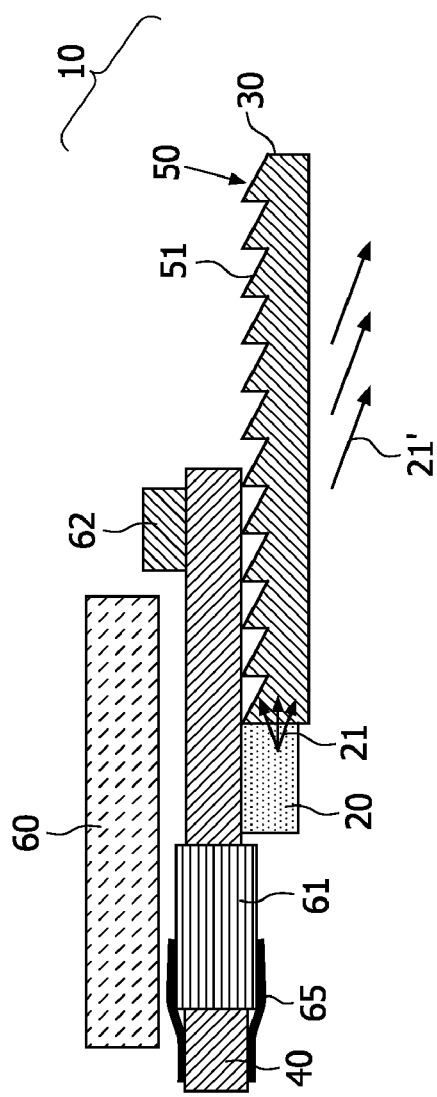
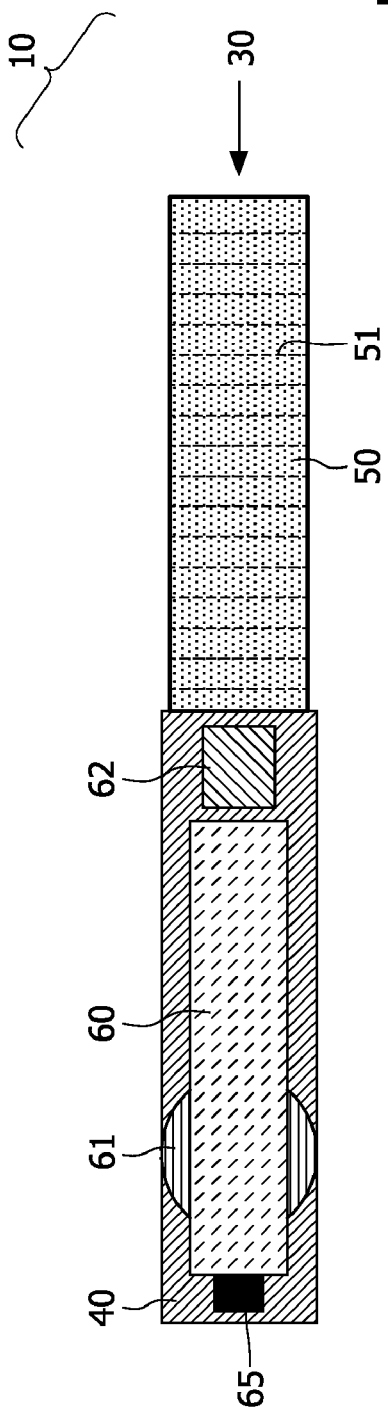

ILLUMINATION DEVICE

FIELD OF THE INVENTION

This invention relates to an illumination device for illuminating a surface, with a lighting element and an illuminating body, wherein the lighting element emits an artificial light, a housing element comprises the lighting element and supports the illuminating body, the illuminating body comprises a transparent light conductive material and is generally overlying the surface, being illuminated.

BACKGROUND OF THE INVENTION

In the U.S. Pat. No. 6,951,403 B2 a device for illuminating a generally flat surface is described, which comprises a battery operated light source contained within a housing to which a transparent light conductive illuminating body is mounted. The device may be placed with the illuminating body over a book or other flat surfaces for illuminated viewing through the transparent illuminating body. The illuminating body is tapered in a wedge-shape to deflect the conducted light onto the underline surface. Unfortunately, the described device is less convenient for reading books, which possess in general a curved reading area. The interaction of the curved reading area with the tapered illuminating body leads to a deformed image of the illuminated page. In addition, the page is not lit optimally uniformly, either decreasing reading comfort or increasing power consumption of the device. Furthermore, the device is a relatively thick wedge shaped light guide where the thickness results in relatively high weight and this reduces ease of use. It also results in a relatively high mechanical stiffness making it very difficult to bend the device over a curved reading area.

SUMMARY OF THE INVENTION

Thus, the invention has for its object to eliminate the above mentioned disadvantages. In particular, it is an object of the invention to provide an efficient and cheap illumination device, which generates a pleasant light level and directs emitted artificial light onto the surface to be illuminated.

This object is achieved by an illumination device for illuminating a surface with a lighting element and an illuminating body, wherein the lighting element emits an artificial light, a housing element comprises the lighting element and supports the illuminating body, the illuminating body comprises a transparent light conductive material suitable for illuminating the surface lying subjacent, characterized in that, the illuminating body comprises a light extraction layer, configured to receive and to deflect the artificial light from the lighting element onto the surface. Advantageous embodiments of the illumination device for illuminating a surface are defined in the subclaims.

The invention discloses, that the illuminating body comprises a light extraction layer, configured to receive and to deflect the artificial light from the lighting element onto the surface.

In a preferred embodiment the light extraction layer is transparent for the artificial light, reflected by the surface. Additionally, the light extraction layer may be transparent for an ambient light, falling onto the light extraction layer. These criteria are important if the illumination device is used as reading light, to illuminate the pages of a book. If a normal light source is used for reading e.g. a book, it may disturb others, especially if used in bedrooms. To avoid disturbing others, the illumination device described in this invention can be used as a reading light. In this embodiment it is important, that the emitted artificial light illuminates just the page of the book and not the surrounding. Thus, the lighting element should be mounted to one of the side faces of the illuminating body. The light injected into one of the side faces has to be deflected, so that as much light as possible leaves through the bottom side of the illuminating body, being above the sheet of e.g. the book. Therefore, the light extraction layer which deflects the artificial light has to be transparent for the light reflected by the surface of the sheet, so that the text, being covered by the illuminating body is lighted up and can easily be viewed by a person.

In a preferred embodiment a lighting element is arranged on one of the side faces of the illuminating body. Last named illuminating body may possess a longish extension, and emits light mainly through the top or bottom surface. As the artificial light is injected into one of the side faces, the light extraction layer has to be positioned opposite to that surface through which the artificial light should leave the illuminating body. If for example, the artificial light should leave the illuminating body through the bottom side, the light extraction layer preferably covers the topside of the illuminating body. As the artificial light, being injected into the illuminating body, has a divergence it either directly leaves the illuminating body through the bottom or topside or side faces or it hits the light extraction layer, where it is deflected and leaves the illuminating body mainly through the bottom or topside.

To achieve the object of the invention the extraction layer must comprise a surface structure, enhancing the amount of light deflected onto the surface. This can be achieved by a surface structure covering one of the surfaces of the illuminating body or a structure in the illuminating body itself. Furthermore, the surface structure may possess a cross section which is equal to a line up of small triangles, trapeze or parallelograms. Light rays that meet the surface structure at a low angle are reflected from the boundary between illuminating body and the surrounding air back into the illuminating body and onto the surface, being illuminated. The surface structure may possess a homogeneous design throughout the surface of the illuminating body. In another preferred embodiment the design of the surface structure may change along the main axis of propagation of the light inside the illuminating body.

In another embodiment the surface structure is build by a number of deflection means, being successively lined up and covering one of the surfaces of the illuminating body. The deflection means may each comprise a cross section, which is saw tooth like, ramping downwards as the distance to the lighting element increases, till to a point where the cross section sharply rises. Each deflection means may possess a width between 10 micrometer and 10 mm, preferably between 30 μm and 3 mm, most preferably between 100 μm and 1 mm. The angle between the illuminating body and the downward ramping side of the deflection means may be between 0.1° and 5°, preferably between 0.2° and 3°, more preferably between 0.25° and 2°. Furthermore, the angle may change with respect to the distance to the lighting element, being positioned on one of the side faces of the illuminating body.

Preferably, the lighting element is at least one of the following: a LED, an OLED, an incandescent lamp or a fluorescent lamp. Depending on the type of usage of the illumination device, a single or a plurality of lighting elements can be used. A light emitting diode (LED) is a semiconductor device that emits incoherent narrow spectrum light (typically in the order of 10-20 nm) when electrically biased in the forward direction. The color of the emitted light depends on the composition and the condition of the semiconducting material used. Moreover, phosphor converted LEDs can be used. In that case, also the phosphor influences the color of the emitted light. The also applicable organic light emitting diode (OLED) is a special type of a LED, in which the emissive layer comprises a thin film of certain organic components. The advantage of the OLED is that it is a homogeneous large area light source with potentially low costs and high efficiency. The OLEDs utilize current flowing through a thin film of organic material to generate the light. The color of light being emitted and the efficiency of the energy conversion from current to light are determined by the composition of the organic thin film material. The color of light emitted by the lighting element may also be cold white light (white light with a large content of blue light compared to warm white light) or some of the lighting elements in case of the presence of a plurality of lighting elements emit light blue light or light in the near UV spectral range in order to alert the user or keep the user awake.

The OLEDs comprise a substrate material as a carrier layer, which may be made of glass or an organic material. Onto this carrier layer usually a thin layer of a transparent Indium-Tin-Oxide (ITO) is applied, forming the anode. Furthermore, organic light emitting diodes consist of at least one very thin layer with a layer thickness of approx. 5-500 nm of organic substances. The OLED is regularly completed with a layer of aluminum, forming the cathode, whereas the aluminum layer features a thickness of approx. 100 nm and thus a thickness like the ITO-layer. Aluminum of such a thickness works as a mirror, such that the emission is through the transparent ITO anode and the transparent substrate only. By choosing a transparent cathode, light may also be emitted through the cathode. Thus, in a preferred embodiment the illuminating body incorporates an OLED. In other words, in this case the illuminating body contains the lighting element. Precondition for this embodiment is that the OLED possesses a cathode, which is transparent, so that the user views the illuminated surface through the illuminating body. By the use of a light extraction layer, the artificial light, being generated within the OLED and randomly directed, is deflected onto the surface.

In a preferred embodiment the illuminating body covers an area, respectively comprises a size of at most 300 cm$^2$, preferably less than 100 cm$^2$, more preferably less than 10 cm$^2$. If the illuminating device is used as a reading light, it has to be small and lightweight, so that it can be conveniently used. To achieve this aim, preferably only one LED in combination with the illuminating body and the light extraction layer shall be used. To achieve a pleasant light level, the lit area has to be small. As perception research has shown, a lit area of about 1 cm×5 cm is already convenient for reading. As a result, LEDs with a power consumption of less than 50 mW, preferably less than 10 mW are sufficient to achieve an illumination level of preferably 25-2000 lux, more preferred 50-250 lux and most preferred larger than 75 lux.

Preferably, the illumination device comprises a solar cell, converting photons from the sun into electricity. The solar cell can be mounted on the housing element to generate electricity to power the lighting element. For storing the electricity the illuminating device may comprise a battery, preferably a rechargeable storage battery. By the use of a solar cell, the invention discloses a solar powered LED lamp, energized during the day and suitable for use at nighttime to read in the dark. Furthermore, the solar cell may cover the illuminating body and/or the light extraction layer at least partly. For this embodiment a transparent solar cell, like a Graetzel cell, has to be used, so that the solar cell is not attenuating the light flux, being reflected by the illuminated surface.

In a preferred embodiment, the illuminating body and/or the light extraction layer comprises an organic material and/or a polymer, preferably that the illuminating body and/or light extraction layer comprises one of the following materials: polyethylene, polyamide, polypropylene, polystyrene, polymethylmethacrylate (PMMA) or polycarbonate (PC). The usage of polymeric plates for the illuminating body has shown to be advantageously. The named materials have a small attenuation of the light flux, being injected by the lighting element. So a thin illuminating body can be used, which results in a light weight illumination device. As a result of the so achieved reduced mechanical stiffness, it is possible to bend the device over a curved reading area. Furthermore, it is possible to dope the polymeric illuminating body with luminescence materials. Those luminescence materials on the one hand enhance the scattering of the light and on the other hand may shift the wavelength of the light. By the usage of appropriate luminescence material the light of cheap and efficient blue LEDs can be converted partially into yellow light, resulting in white light, which is appropriate for convenient reading. By the combination of the absorption/reemission and additionally scattering the luminescence material increases the amount of light being directed onto the surface.

To protect the illuminating body and/or the light extraction layer from environmental impacts, a further preferred embodiment discloses a protection layer. The last named layer may clad the illuminating body as whole or just parts of it, like the light extraction layer. Furthermore, the protection layer may comprise $SiO_2$, $HfO_2$ or $SiN_x$. Those materials are known to be scratch resistant and unaffected by environmental impacts like humidity. This is especially important, as some polymers are susceptible to hydrolysis, so that an illumination device without protection layer may age due to the environmental impacts.

If the lighting element is a point like light source—like a LED—not covering the whole side face, dark areas in the direct surrounding of the lighting element may occur. They arise due to the fact, that the lighting element emits the artificial light in a cone into the illuminating body. Although scattering occurs, the areas bordering this cone of light are not fully illuminated. A way to solve this problem is by placing the lighting element not in the centre but in the corner of a side face of the illuminating body. To further reduce the effect, the side face can be tilt to build a facet on which the lighting element is positioned. If the tilted facet possesses an angle between 30° and 60°, preferably between 40° and 50° the best results are achieved. Moreover, the remaining corners of the illuminating body can be rounded to achieve a uniform illumination pattern. To enhance the light output of the illuminating device, it is preferably that the edges of the illuminating body are covered with a reflective medium like mirrors or scattering layers.

In another preferred embodiment the illumination device comprises a modular design. So for example the illuminating body may be detached and/or folded about a hinge, positioned in the housing element. In another embodiment the illuminating body may—after detaching and/or folding—be contained in the housing element. Thus, parts of the illumination device may be protected, while not in use.

In another embodiment the illuminating body further comprises luminescent material in order to affect light propagating almost parallel to the bottom surface of the illuminating body. The luminescent material will absorb a certain part of this light and will re-emit almost all absorbed light in a different direction compared to the incident direction. As a result more light will be emitted through the bottom surface of the illuminating body and less light will leave the illuminating body through the side faces of the illuminating body.

In another embodiment the luminescent material is arranged in at least one cavity, preferably arranged in proximity to the bottom surface of the illuminating body. Here, the light redirected by the deflection means will only be affected to a minor portion, while a large portion of the light propagating almost parallel to the bottom surface of the illuminating body will be absorb and re-emitted. In a more preferred embodiment, the cavities further comprise a reflective layer towards the light extraction layer in order to reflect re-emitted light towards the bottom surface of the illuminating body The illuminating device as used as a reading lamp may be placed in a certain distance to the illuminated surface or illumination device is generally overlying the surface being illuminated.

To modify the illumination device into a table lamp like device or torch like device, the invention discloses an optical element. The optical element uses that part of the artificial light not reaching and/or not directed at the surface. So, the optical element is configured to receive and to direct at least a part of the artificial light leaving the illuminating body. To achieve this aim, the optical element is an optical system, which may be formed of a single or a plurality of lenses and/or mirrors. The artificial light leaving the illuminating body through one of its outer surfaces may possess a diffuse distribution. The optical element is able to reflect and/or to reshape the flux of the artificial light to achieve a non-focused, focussed, de-focussed and/or a parallel beam. With the help of the optical element the disclosed illumination device can not only be used as a reading light but also as a table lamp like device with a reflector element as the optical element enabling to illuminate a book, preferably with a not too strong collimated spot, or as a torch like device with an condensor element as the optical element, preferably providing a collimated spot or parallel light beam.

Depending on the type of use the optical element may be arranged on different outer surfaces of the illuminating body. Preferably, the optical element is arranged on a longitudinal side of the illuminating body, so that the artificial light leaving these longitudinal sides may be reshaped. As the artificial light leaving the illuminating body through the bottom side may possess just a small defection angle with respect to the illumination device, it is also possible that the optical element collects and reshapes parts of this light. Therefore, the optical element may possess a size larger than the height of the illuminating body.

In another preferred embodiment the optical element is reversibly attachable to the illuminating body. This enables a user to use the illumination device for two different purposes. On the one hand the illumination device may be used as a reading light or table lamp, illuminating a page of a book. On the other hand it is possible to attach the optical element to the illumination device to achieve a torch like device, which is able to illuminate an arbitrary spot in the surrounding. Preferably the optical element comprises a clip means, wherein the clip means is concurring with a second clip means of the illuminating body to attach the optical element to the illuminating body. Through the use of the two said clip means it is possible to easily attach the optical element to the illuminating body. A user is able to attach and/or to detach the optical element without the need of a tool or other elements.

In another preferred embodiment the optical element comprises a changeable lens element. With the help of the changeable lens element the receiving and directing of at least a part of the artificial light can be adjusted. So it is possible, to shape the flux of artificial light in different ways. If needed either a focussed light spot is achievable or the light flux may be arranged in a parallel manner to illuminate a larger area. Preferably, the changeable lens element is formed by a LC (Liquid Crystal) structure.

In another embodiment with the optical element as a reflector element, the reflector element is movable mounted to the illuminating body suitable to direct an adjustable part of the artificial light leaving the illuminating body to an object. The movable mount may be a hinge, a joint, a bendable pin or clip or other mounts known by people skilled in the art arranged between the illuminating body and the reflector element and/or between said clip means and the reflector element.

In a preferred embodiment the reflector element further comprises a mirror element covering the light extraction layer. Here, also the light leaving the illumination body through the surface of the light extraction layer opposite to the side facing towards the object to be illuminated will be directed towards the object or towards the reflector element enhancing the brightness of the light illuminating the object. The mirror element may be arranged on the housing element, the illuminating body or on the reflector element. The mirror element may be reversible attachable to the reflector element or the housing element or as part of the reflector element reversible attachable to the illuminating device together with the reflector element. The mirror element can be any more or lee planar object with at least an reflective surface facing towards the light extraction layer to reflect the light back to the illumination body. The mirror element may be arranged at a certain distance to the illuminating body or may be arranged in direct contact on top of the illumination body.

In an alternative embodiment the illuminating device is a torch like device with the optical element as a condenser element. The reshaping of the light flux of the artificial light can be achieved with the condensor element comprising a surface formation. The surface formation may cover large parts of the condensor element, especially those parts of a condensor element which are not in direct contact with the illuminating body. Artificial light leaving the illuminating body through the longitudinal side may therefore directly cross into the condensor element. The last named element may comprise a light conductive material, so that the artificial light is guided without attenuation. The light conductive material of the condensor element may be the same as the one used for the illuminating body.

The surface formation is able to focus or to shape the artificial light in a parallel manner. To achieve this aim, the surface formation may comprise a cross section, which is saw tooth like, ramping downwards as the distance from a centre of the condensor element increases. Each element of the surface formation may possess a width between 10 micrometer and 10 mm, preferably between 30 μm and 3 mm, most preferably between 100 μm and 1 mm. The formation angle between the condensor element and the downward ramping side of the surface formation may be between 0.1° and 5°, preferably between 0.2° and 3°, more preferably between 0.25° and 2°. This surface formation may also be arranged in such a way, that it forms a Fresnel-type lens.

In another preferred embodiment, the lighting elements comprises switching means suitable to operate the lighting elements in a first mode at minimum electrical power (e.g. as a reading light) and in a second mode at higher electrical power (e.g. as a table lamp like device or a torch like device). Suitable switching means are known by people skilled in the art, e.g. electrical switch or ICs.

The aforementioned illuminating device, as well as claimed components and the components to be used in accordance with the invention in the described embodiments, are not subject to any special exceptions with respect to size, shape, material selection. Technical concept such that the selection criteria are known in the pertinent field can be applied without limitations. Additional details, characteristics and advantages of the object of the present invention are disclosed in the subclaims and the following description of the respective figures—which are an exemplary fashion only—shows a plurality of preferred embodiments of the illumination device according to the present invention.

BRIEF DESCRIPTION OF THE DRAWINGS

Theses figures are:

FIG. 1 shows a first embodiment of an illuminating device, according to the invention, FIG. 2 shows the illumination device from another perspective, comprising a housing element and an illuminating body, FIG. 3 perspective view of the illuminating body, FIG. 5 shows a second embodiment of the illumination device (side view), FIG. 6 top view of the illumination device of FIG. 5, FIG. 7 another embodiment of the illumination device, according to the present invention, FIG. 8 another embodiment of the illumination device, FIG. 9 another embodiment of the illumination device with rounded corners of the illuminating body, FIG. 10 illuminating body with cavities comprising luminescent material

DETAILED DESCRIPTION OF EMBODIMENTS

Figure 3:
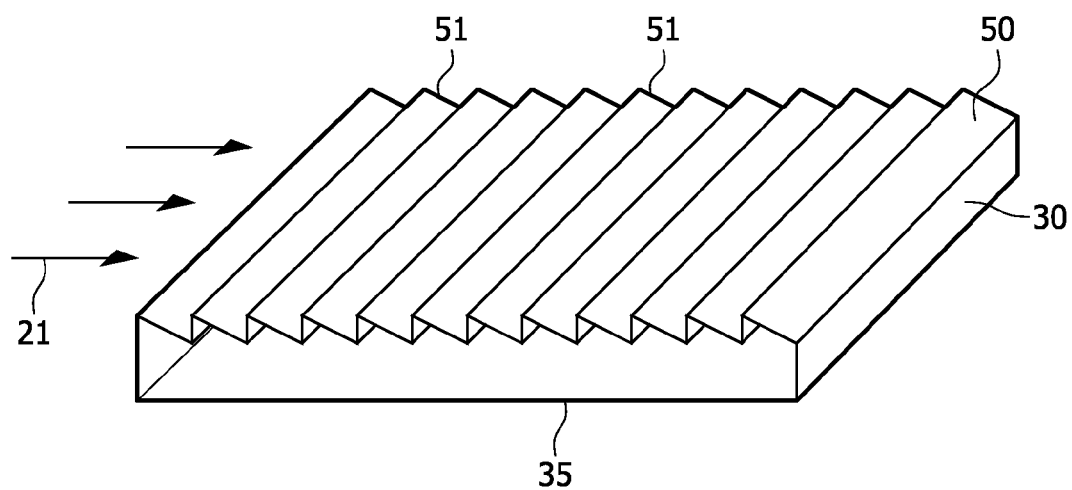

In FIG. 1 an illumination device 10 for illuminating a surface is shown. The illumination device 10 comprises a lighting element 20 and an illuminating body 30. The lighting element 20 is arranged subjacent to a housing element 40, which supports the illuminating body 30. In the shown embodiment the illumination device 10 is a reading light, used to illuminate a generally flat surface, such as a page of a book, lying subjacent to the illuminating body 30. To reduce the possibility of disturbing other people, the emission of artificial light 21 beyond the surface, being illuminated, has to be minimal. To achieve this aim the illuminating body 30 comprises a light extraction layer 50, configured to receive and to deflect the artificial light 21 from the lighting element 20 onto the surface.

The lighting element 20 is a LED, which injects the artificial light 21 into the illuminating body 30. The lighting element 20 is connected with the holding element 40, which may be a printed circuit board (PCB). Such printed circuit boards are used to mechanically support and electrically connect electronic components, using conductive pathways, etched from copper sheets laminated onto a non-conductive substrate. Such structures are known to be inexpensive and highly reliable. Furthermore, the LED can directly be connected to the electronic components with the help of the PCB. Opposite to the lighting element 20 a driver 62 and a battery 61 are installed on the housing element 40. The battery 61 is preferably rechargeable and delivers the needed current for the lighting element 20. The driver 62 may include a current amplifying circuit and a waveform generating and controlling circuit, which outputs the desired waveform. Also, the waveforms amplitude, frequency and duty ratio are adjusted by the waveform generating and controlling circuit.

To use the illumination device 10 in regions of the earth, where electrical power is difficult to get or expensive, a solar cell 60 may be embedded onto the housing element 40. The solar cell 60 converts photons from the solar light into electricity, stored in the rechargeable battery 61. So if the illumination device 10 is exposed to solar light during the daytime, the illumination device 10 can be used in the dark. To gain an illumination device 10 which in spite of the solar cell 60 is able to illuminate the surface for a long period of time, a lighting element 20 with low power consumption is needed. LEDs have been shown to be appropriate, because they achieve a sufficient light level with low power consumption.

As it has been said, the aim of the invention is the uniform lighting of the surface, positioned in the shown embodiment subjacent to the illuminating body 30. As the artificial light 21 is injected from a single lighting element 20, positioned at a side face 36 of the illuminating body 30, the artificial light 21 has to be deflected in such a way, that it leaves the illuminating body 30 through the bottom face 35, as shown by the arrows 21'. To achieve this aim the light extraction layer 50 is mounted on the top surface of the illuminating body 30. In the shown embodiment the light extraction layer 50 and the illuminating body 30 are one piece, made of the same material.

In FIG. 2 a view from above onto the illumination device 10 is shown. The surface to be illuminated by the illumination device 10 is in the plane of the drawings. Although using a LED with a power consumption of below 10 mW, the illumination level should reach at least 25 lux. Therefore, it is appropriate that the size of the illuminating body 30 is limited. Preferably, the illuminating body 30 possesses a length 32 between 30 mm and 150 mm, more preferably between 50 mm and 100 mm. In addition, the illuminating body 30 should possess a width 33 between 5 mm and 40 mm, more preferably between 10 mm and 20 mm for illumination with one LED only. The length 32 and the width 33 of the illuminating body 30 should result in a size of at most 100 cm$^2$, more preferably less than 50 cm$^2$ and most preferably less than 10 cm$^2$. In addition, the height of the illuminating body 30 should not exceed 40 mm, more preferably should not exceed 10 mm and most preferably should not exceed 5 mm. The minimum height of the illuminating body 30 is determined by the dimensions of the LED(s) used. The use of more than one LED for injecting the artificial light 21 into the illuminating body 30 is explicit part of the invention.

Figure 4:
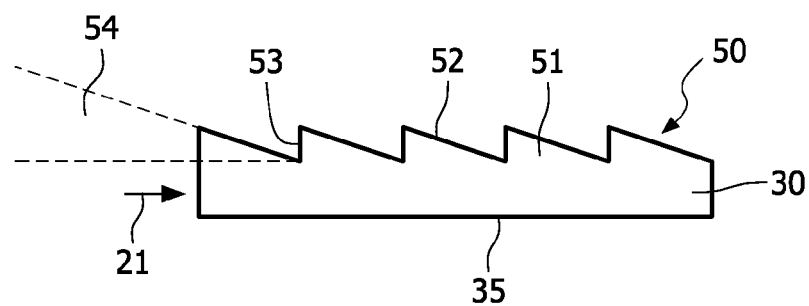
FIG. 4 shows a cross section of the illuminating body of FIG. 3.

To reduce the amount of artificial light 21, not being deflected onto the surface but scattered in the surrounding, the invention discloses the light extraction layer 50. The configuration of the light extraction layer 50 is shown in the FIGS. 3 and 4, only illustrating the illuminating body 30. The artificial light 21 is injected from the left side into the illuminating body 30. To deflect the artificial light 21 onto the surface being positioned subjacent to the illumination body 30 the light extraction layer 50 possesses a surface structure. This surface structure comprises a plurality of deflection means 51, which are arranged in a consecutive manner. In FIG. 4 a magnification of a cross section of the illuminating body 30 is shown. The artificial light 21 enters the illuminating body 30 from the left side. Each deflection means 51 possesses a saw tooth like cross section with a flange 53, sharply rising from the illuminating body 30. Subsequent, the deflection means 51 possesses a face 52, which ramps downwards as the distance to the lighting element 20 increases. So a saw tooth like structure is build, possessing a triangular shape. The face 52 possesses an angle 54, measured with respect to the longitudinal extension of the illuminating body 30. Depending on the wavelength of the artificial light 21 and on the index of refraction of the material used for the illuminating body 30 the angle 54 should be between 0.1° to 5°, preferably between 0.25° and 2°. As the index of refraction of the surrounding air differs from the index of refraction of the material of the illuminating body 30 total internal reflection occurs. Thus, artificial light 21 meeting the air—illuminating body 30/light extraction layer 50 boundary can be reflected leaving the illuminating body 30 mainly through the bottom surface 35. Apart from the shown saw tooth like structure, the deflection means 51 may possess a plurality of different cross sections. It is just important, that a face 52 is positioned at an angle 54 towards the lighting element 20, so that a mirror like deflection area is established.

In FIGS. 5 and 6 another embodiment of the illumination device 10 is shown, possessing a rechargeable coin cell battery 61, positioned within the housing element 40. To switch on and off the illumination device 10 a switch 65 is mounted at one end of the housing element 40. This embodiment has the advantage, that the usage of a coin cell battery reduces the overall thickness of the illuminating device 10. Therefore it is possible to press the switch 65 to activate the illumination device 10 in a convenient manner. In contrast to the illumination device 10 the solar cell 60 is a foil like structure, contributing just a small amount to the total height. As in the embodiments described above, the light extraction layer 50 and the illuminating body 30 are one piece, built out of an organic material, like a polymeric light guide plate. Last named plates are transparent and possess a low attenuation for light in the visible wavelength range. Furthermore, illumination bodies 30 made from a polymeric plate can easily be doped with luminescence materials. Those luminescence materials can absorb the artificial light 21 and re-emit it with a different wavelength. Furthermore, the luminescence material can contribute to the scattering of the artificial light 21 emitted by the lighting element 20. This scattering leads to an additional light component being deflected onto the surface, to be illuminated.

Figure 7:
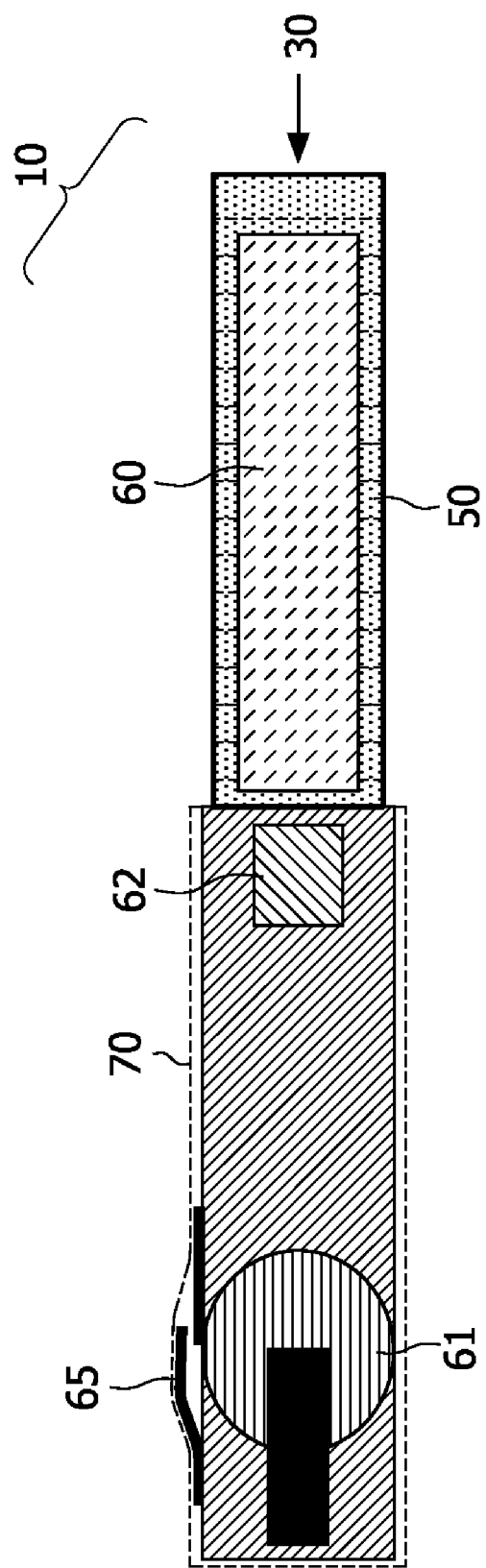

In FIG. 7 another embodiment of the illumination device 10 is shown. In contrast to the described illumination devices 10, the switch 65 is located on one of the side faces of the housing element 40. This increases the convenient usage of the illuminating device 10. Moreover, the solar cell 60 is positioned onto the illuminating body 30. To view a text, being covered by the illuminating body 30, the last named as well as the light extraction layer 50 have to be transparent to the artificial light 21, reflected by the surface. To obtain this feature, the solar cell 60, covering the light extraction layer 50 has also to be transparent for the artificial light 21. By the use of a photoelectrochemical cell, like a Graetzel cell, a transparent solar cell 60 can be established. This embodiment has the advantage that the size of the housing element 40 can strongly be reduced. Because the solar cell 60 covers the illuminating body 30 there is no need for a large housing element 40, as all remaining components—e.g. battery 61, lighting element 20—are small in size compared to the solar cell 60. Furthermore, the illumination device 10 possesses a cover element 70 protecting the illumination device 10 from environmental impacts like humidity. The cover element 70 may be made out of rubber, cladding the housing element 40 and/or parts of the illuminating body 30.

Figure 8:
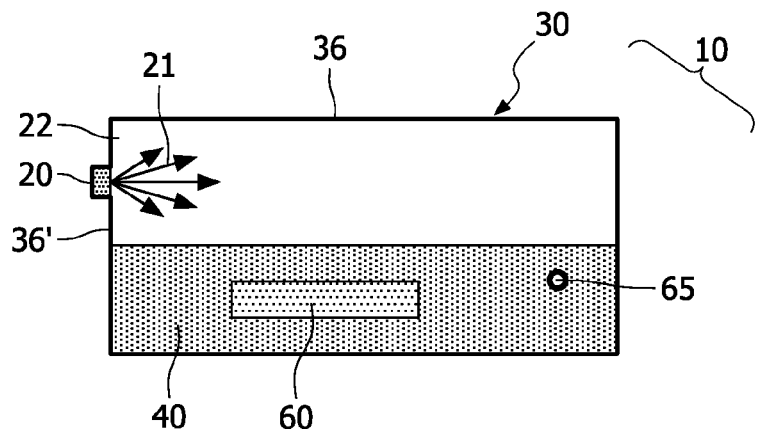
Figure 9:
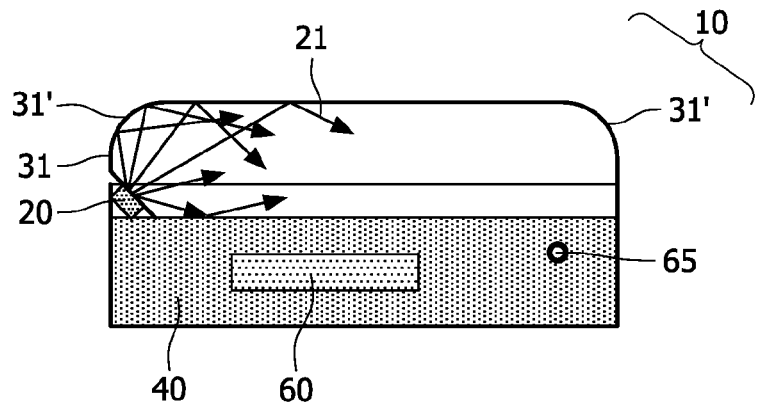

In FIG. 8 another embodiment of the illumination device 10 is shown. Deviating from the above described embodiments, the housing element 40 is arranged at one of the long side faces 36 of the rectangular illuminating body 30. The lighting element 20 is positioned on one of the small side faces 36' of the illuminating body 30. The illumination device 10 is equipped with the solar cell 60 and the switch 65, already described above. Due to the fact, that the lighting element 20 is arranged on one of the small side faces 36' of the illuminating body 30, and due to the limited divergence of the light, emitted by the lighting element 20, the artificial light 21 possesses a cone like distribution, leaving a dark area 22. Only a very small amount of artificial light 21 will reach this dark area 22 due to scattering within the illuminating body 30. To reduce this disturbing dark area 22 the lighting element 20 may be mounted in one of the corners 31 of the illuminating body 30, as shown in FIG. 9. In this embodiment, a corner 31 of the illuminating body 30 is being faceted at an angle between 30° to 60°. In addition, the remaining corners 31' are rounded to give a more uniform illumination pattern. As can be seen by the light rays of the artificial light 21 no dark areas 22 will occur in the illuminating body 30. On the contrary, a very uniform illumination of the illuminating body 30 is generated, enabling a user to conveniently read a text, being covered by the illuminating body 30.

Figure 10:
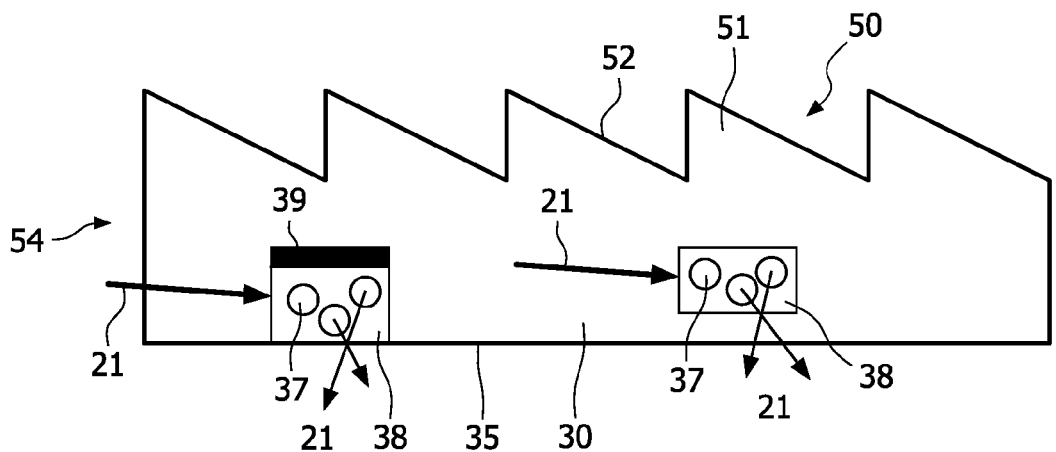

The illuminating body 30 may comprise luminescent material 37 in order to absorb light 21 propagating almost parallel to the bottom surface 35 of the illuminating body 30 and to re-emit this light in a different direction compared to the incident direction. This condition is almost always fulfilled if the luminescent material emits light isotropically. If luminescent particles with anisotropic emission are used, the angle distribution of the re-emitted light can be further aligned towards the bottom surface 35. The luminescent material 37 can be homogeneously dispersed in the illuminating body 30 and/or arranged in cavities 38, as shown in FIG. 10. The cavities may have any shape, the rectangular shape of the side view shown in FIG. 10 is only one possible example. The luminescent material should have strong absorption in the spectral range of the light emitted by at least one or more of the lighting elements 20. Possible examples of luminescent materials 37 are organic lumogens from BASF or inorganic material such as $Y_3Al_5O_{12}$:Ce or $(Sr, Ba)_2SiO_4$:Eu. The material 37 is preferably an organic material, which can be easily dissolved in the illuminating body 30. At least some of the lighting elements may emit blue and/or near-UV light in order to enable a re-emission of light by the luminescent material with wavelengths within the whole visible spectrum. To obtain a homogeneous white light, the amount of luminescent material has to be adjusted carefully as a function of the distance to the lighting elements and the shape of the illuminating body. The luminescent material can be used to obtain any desired color of light 21 leaving the illuminating body 30. It is preferred to adjust the amount and optical properties of the material 37 in order to emit cold blue light 21 to better alert the user and keep the user better awake. To prevent the luminescent light from reaching the user directly, one may cover the cavities 38 with a reflective layer 39 on the side facing towards the light extraction layer 50. The size of the cavities 38 should be small enough to be invisible for the user not to significantly disturb the light reflected from the illuminated surface.

Figure 11:
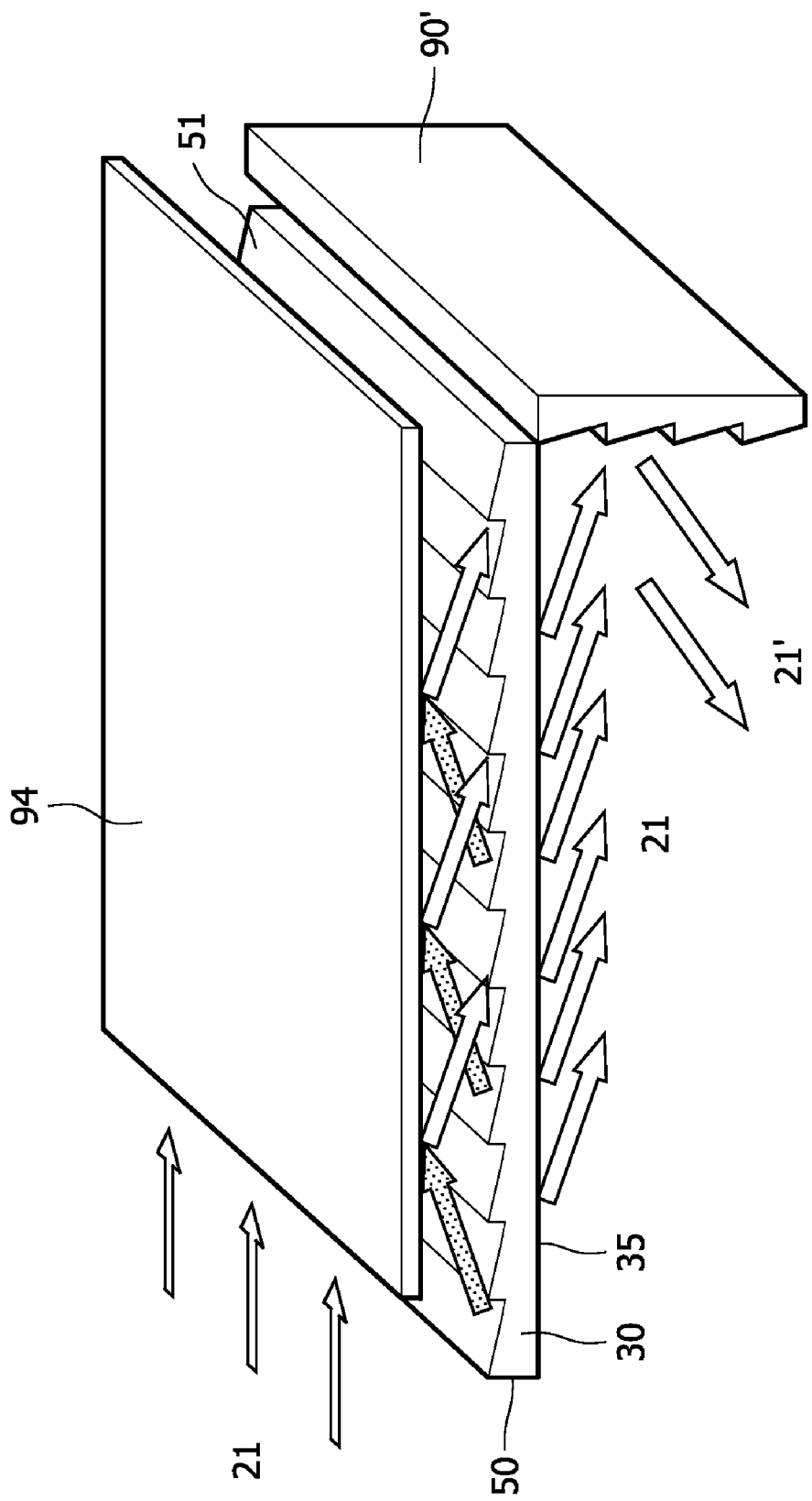
FIG. 11 shows the illuminating body with reflector element and mirror element.

The illuminating body 30 with a reflector element 90' and a mirror element 94 is shown in FIG. 11. To operate the illuminating device as a table lamp like device, the reflector element 90' is essential. The mirror element 94 may be added to the illuminating device 10 to enhance the brightness of the light 21' reflected from the reflector element 90' to illuminate an object. The reflector element reflects at least a part of the light 21 leaving the illuminating body 30 through the bottom surface 35 of the illuminating body 30 towards an object to be illuminated with the light 21'. The amount of reflected light 21' depends on the geometrical properties of the illuminating body 30 and the reflector element 90' as well on the angle position between the reflective surface of the reflector element 90' relative to the bottom surface 35. To enhance the brightness of the light 21', a mirror element 94 may be arranged above the light extraction layer 50. A part of the light propagating through the illuminating body 30 will leave the illuminating body 30 through the surface of the light extraction layer 50. This light will not be reflected by the reflector element 90' in case of no present mirror element 94. The present mirror element 94 will reflect back the light 21 into the illumination body 30 to leave the illumination body 30 through the bottom surface 35. The mirror element may be arranged in a certain distance apart from the illuminating body. However to provide a compact device, this distance should be small. Alternatively, the mirror element 94 may be arranged in direct contact to the light extraction layer 50. In a preferred embodiment, the mirror element 94 exhibit a surface structure adapted to the surface structure 51, 52, 53 of the light extraction layer 50 to fit on top of the light extraction layer 50.

Figure 15:
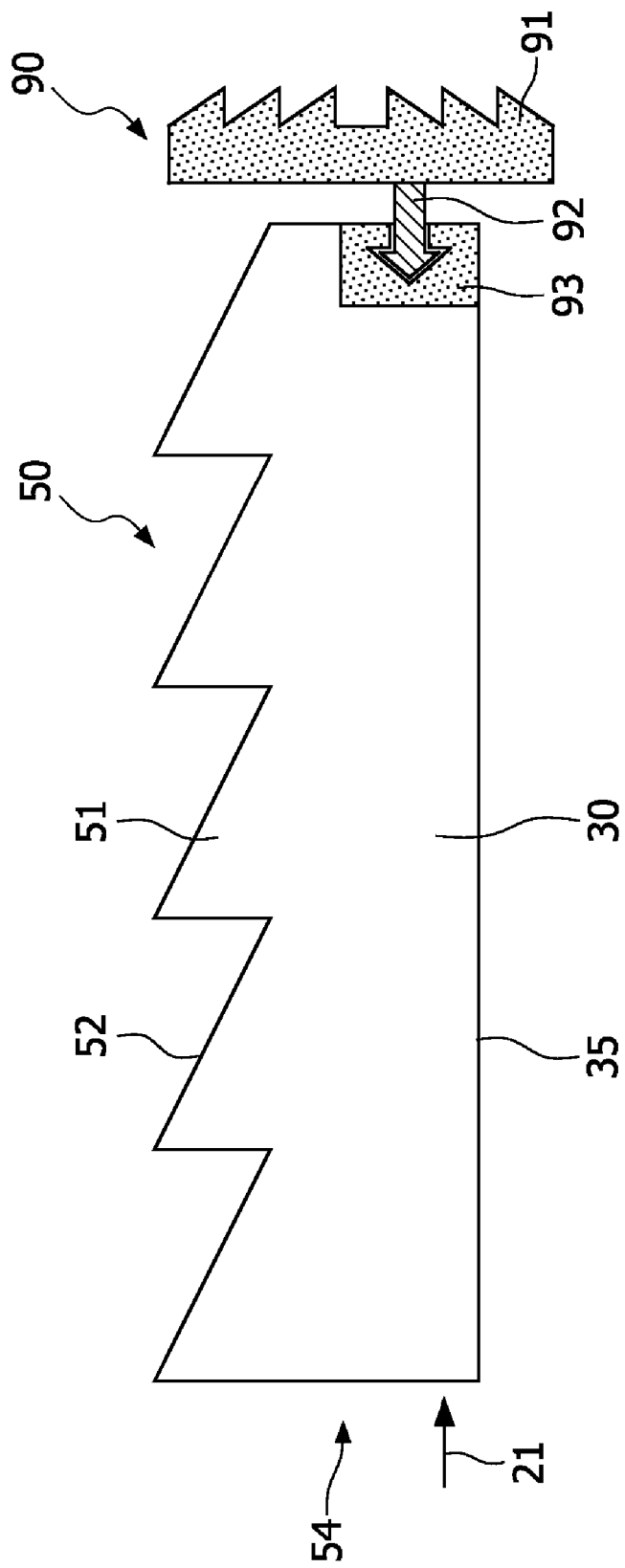

To be able to operate the illumination device as a reading lamp and on demand as a table lamp like device, the mirror element 94 should be reversible mounted to the illumination body 30, the housing 40 and/or the reflector element 90'. The reversible mounting of the mirror element 94 may be achieved with mechanical means such as clips means 92, 93 as shown in FIG. 15 (for the mounting of the optical element) or other mechanical solutions or may be achieved via an adhesive surface of the mirror element 94. People skilled in the art will also consider alternative mounting means.

Figure 12:
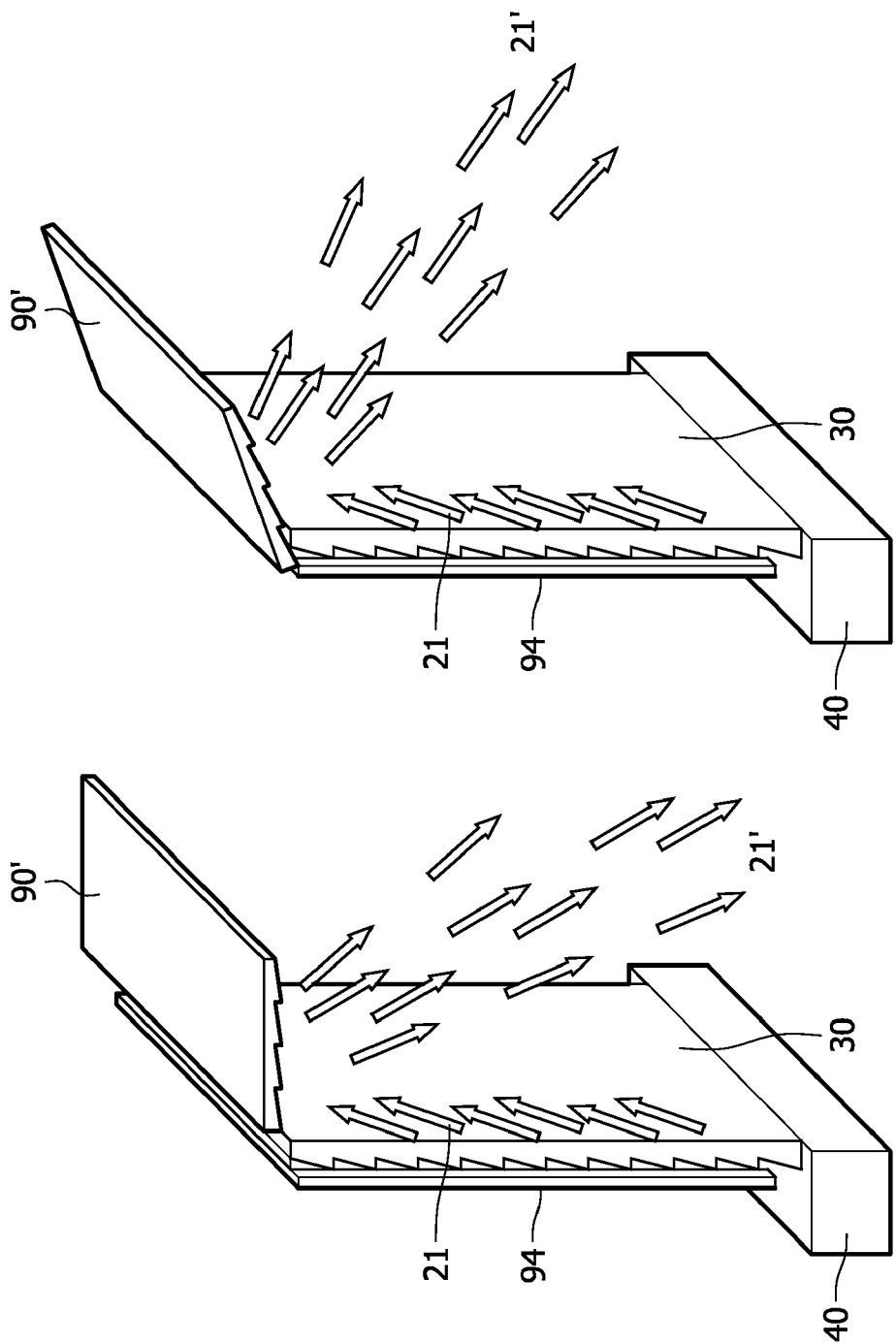
FIG. 12 shows the illuminating device as a table lamp like device with two different positions of the adjustable mounted reflective element, FIG. 13 different shapes of the reflector element of FIGS. 11 and 12

FIG. 12 shows the illuminating device 10 as a table lamp like device with two different position of the reflector element 90'. An illuminating device 10 to be used as a reading lamp and a table lamp like device on demand, the shape of the housing 40 should be suitable to stable positioning the illuminating device 10 in a vertical position as shown in FIG. 12. This could be achieved with a sufficiently large base size of the housing 40 and/or a sufficiently large weight of the housing compared to the attached components such as illuminating body 30, reflector element 90' and optionally the mirror element 94. To adjust the area illuminated by the light 21', the reflector element 90' is adjustable mounted to the illumination device 10, for example via a hinge between reflector element 90' and the illuminating body 30 to adjust the angle between these both element to the desired value. People skilled in the art will also consider other adjustable mountings enabling an adjustable angle between the reflector element 90' and the illumination device 10, preferably the illuminating body 30. The angle between bottom surface 35 and surface of the reflective element 90' may vary between 0 and 360°, preferred between 0 and 180°, more preferred between 90 and 180°.

In another embodiment the reflective surface of reflector element 90' configured to receive and to direct at least a part of the artificial light 21,21' leaving the illuminating body to another direction may be positioned in direct contact to the bottom surface 35 of the illumination body 35. In this configuration, the light 21 will be reflected towards the light extraction layer 35 to leave the illumination body 30 through the surface of light extraction layer 35 opposite to the bottom surface 35. In this case (without a mirror element 94), the illumination device 10 simultaneously acts as a reading lamp illuminating an object via light 21 leaving the illumination body 30 through the bottom surface 35 not covered by the reflective surface of the reflective element 90' and as a light source for other illumination purposes (e.g. room illumination) via light 21 leaving the illumination body 30 through the surface opposite to the bottom surface 35 covered with the reflective surface of the reflective element 90'.

In an alternative embodiment the same functionality as described above may be achieved with a mirror permanently arranged on a part of the bottom surface 35, which is switchable between a transparent mode and a reflective mode. Such switchable mirrors are for instance electrically switchable liquid crystal layers. The effect of the light emitted through the surface of the light extraction layer may be further enhanced for writing purposes, if luminescent paper is illuminated by blue and/or UV light emitted by some of the lighting elements 20.

Figure 13:
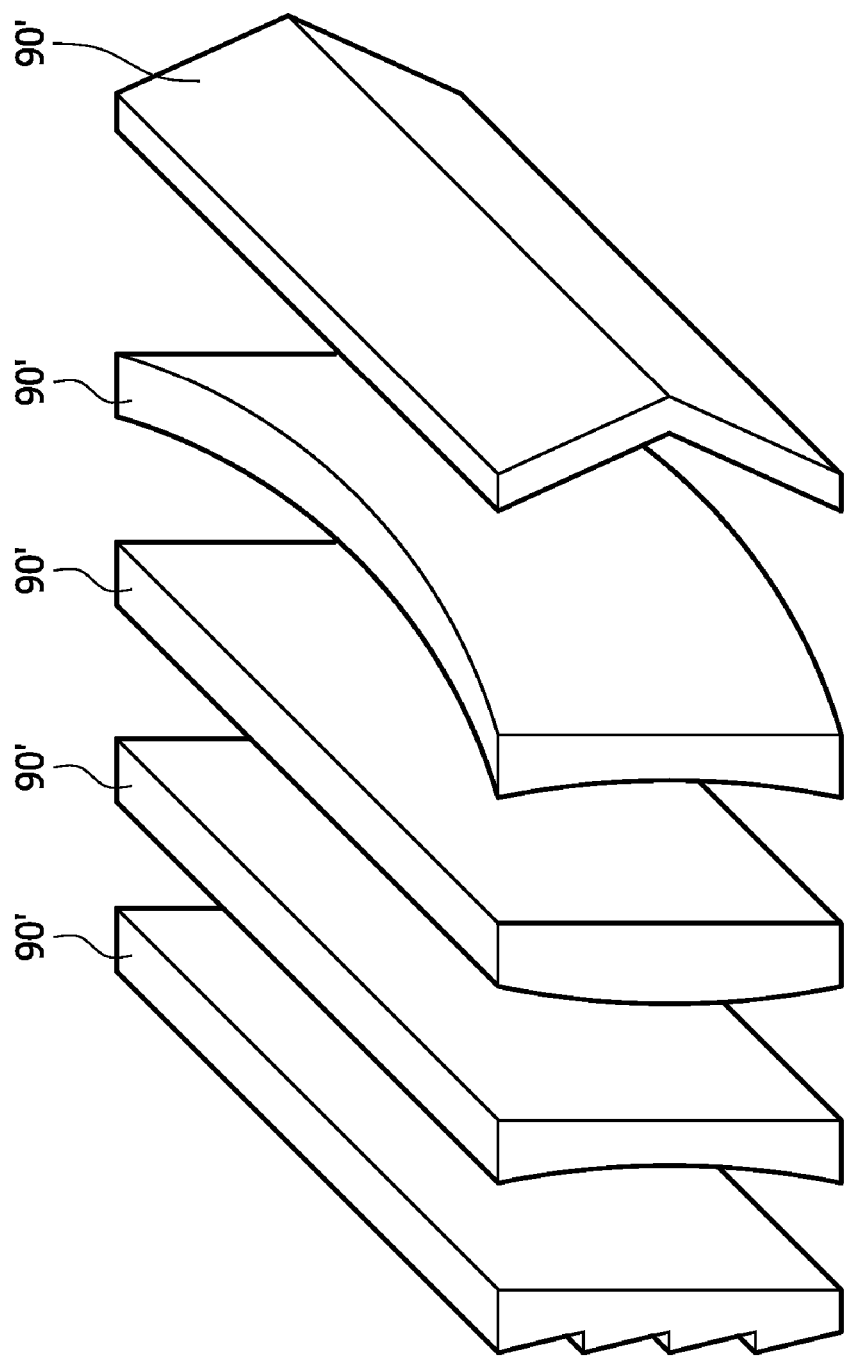

FIG. 13 shows examples of different possible shapes of the reflective element 90' such as micro-structured, curved, or segmented reflecting elements 90'. A planar shape is also possible (not shown here).

Figure 14:
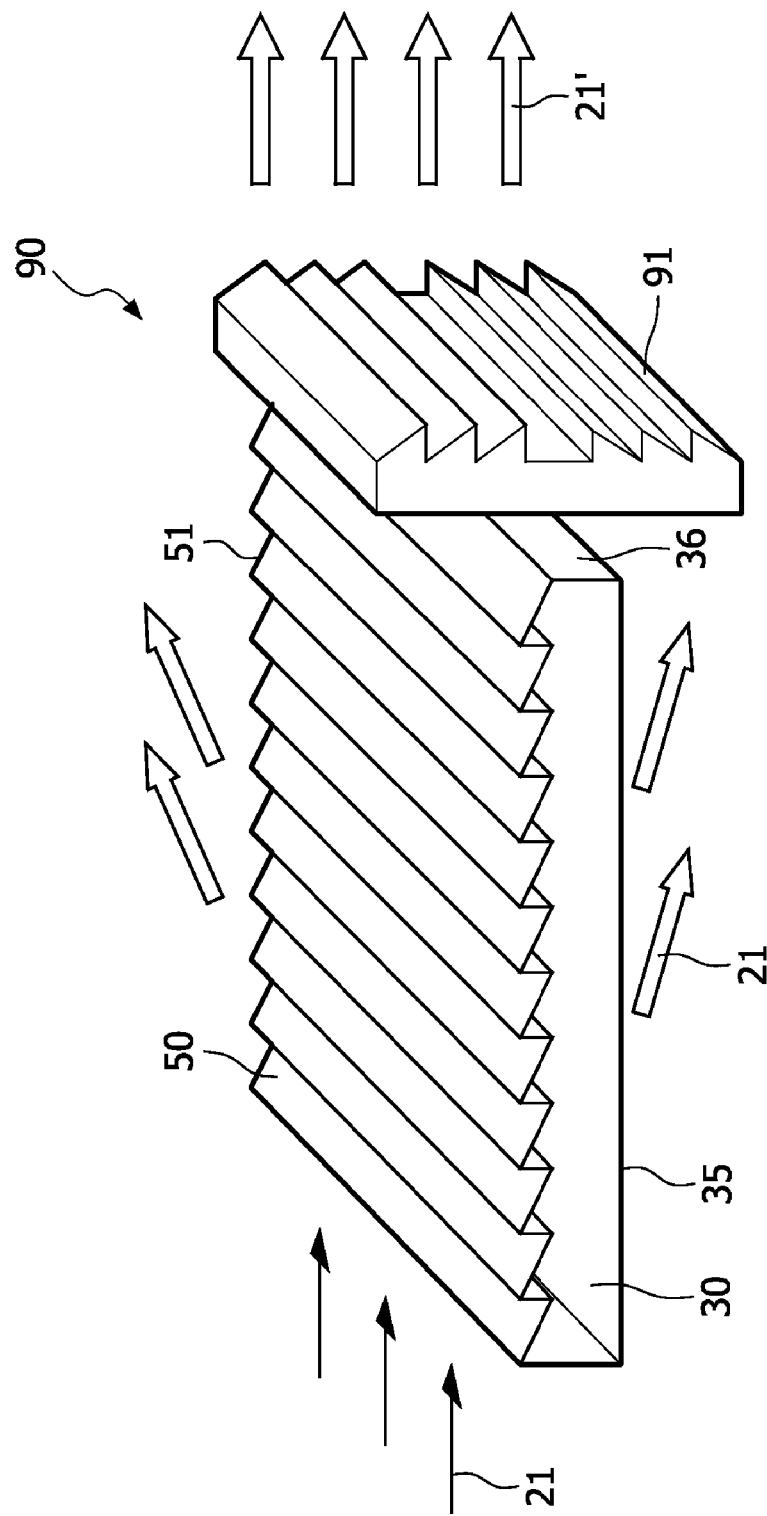
FIG. 14 perspective view of the illumination device as a torch like device with a condensor element, and FIG. 15 side view of the mounting of an optical element (here a condenser element) to the illumination body.

In FIG. 14 the effect of the condensor element 90 is shown. Artificial light 21 is entering the illuminating body 30 from the left side. Parts of the artificial light 21 will penetrate the light extraction layer 50 and leave the illuminating body 30 through its top side. Other parts of the artificial light 21 will marginally be deflected by the light extraction layer 50 and leave the illuminating body 30 through the bottom surface 35 under a small angle. A third part of the artificial light 21 will leave the illuminating body 30 through the side face 36. The last named part and—depending on the size of the condensor element 90—a fraction of the last but one named part of the artificial light 21 will therefore enter the condensor element 90. As the condensor element 90 comprises a light conductive material the artificial light 21 will not be attenuated. The outer surface of the condensor element 90 comprises a surface formation 91, configured to receive and to deflect the collected artificial light 21. The surface formation 91 possesses the ability to shape the flux of artificial light 21', leaving the condensor element 90 to a focused or—as shown here—a parallel flux. Therefore, the illumination device 10 can be used as a torch.

To achieve the ability to use the illumination device 10 as a torch, a condensor element 90 is disclosed. In FIG. 15 a cross section of the condensor element 90 is shown, which is connected to a longitudinal side 36 of the illuminating body 30. Artificial light 21, being injected into the illuminating body 30, and being not or just marginally deflected by the light extraction layer 50, may leave the illuminating body 30 without illuminating the surface 101 as intended. To use this part of the artificial light 21 the condensor element 90 comprises a light conductive material, configured to receive and to direct at least a part of the artificial light 21. Therefore, the condensor element 90 comprises a surface formation 91, which possesses in the shown example a saw tooth like structure. This surface formation 91 may also form a Fresnel-type lens, to focus the artificial light leaving the condensor element 90. Furthermore, the condensor element 90 may comprise a clip means 92, wherein the clip means 92 is concurring with a second clip means 93 of the illuminating body 30. Through a connection of the clip means 92 with the second clip means 93 the condensor element 90 is reversibly attachable to the illuminating body 30.

LIST OF NUMERALS 10 illumination device
20 lighting element
21,21' artificial light
22 dark area
30 illuminating body
31,31' corner of the illuminating body 30
32 length of the illuminating body 30
33 width of the illuminating body 30
35 bottom surface of the illuminating body 30
36,36' side face of the illuminating body 30
37 luminescent material
38 cavity
39 reflective layer
40 housing element
50 light extraction layer
51 deflection means
52 face of the deflection means 51
53 flange of the deflection means 51
54 angle
60 solar cell
61 battery
62 driver
65 switch
70 cover element
90 condensor element
90' reflector element
91 surface formation
92 clip means
93 second clip means
94 mirror element

The invention claimed is:

1. An illumination device for illuminating a surface, the illumination device comprising:
   a lighting element for emitting an artificial light,
   a illuminating body comprising a transparent material and a light extraction layer, configured to receive and to deflect the artificial light from the lighting element onto the surface;
   a housing element for receiving the lighting element therein and supporting the illuminating body;
   wherein the light extraction layer is transparent for:
      (i) the artificial light, reflected by the surface, and
      (ii) an ambient light, falling onto the light extraction layer;
   wherein said light extraction layer covers one of the surfaces of the illuminating body; and
   wherein said light extraction layer includes a saw-tooth surface structure extending outward from said surface of said illuminating body.

2. An illumination device (10) according to claim 1, wherein the lighting element is a LED or an OLED.

3. An illumination device (10) according to claim 1, wherein the illumination device further comprises a solar cell at least partly covering the light extraction layer, and a battery.

4. An illumination device (10) according to claim 1, wherein the illuminating body and/or the light extraction layer comprises a polymer selected from the group consisting of: polyethylene, polyamide, polypropylene, polystyrene, polymethylmethacrylate (PMMA) and polycarbonate (PC).

5. An illumination device (10) according to claim 1, wherein the lighting element is positioned in a corner of the illuminating body, faceted at an angle between 30° to 60.

6. An illumination device according to claim 1, wherein the illuminating body further comprises luminescent material.

7. An illumination device according to claim 6, wherein the luminescent material is arranged in at least one cavity arranged in proximity to the bottom surface of the illuminating body.

8. An illumination device according to claim 1, wherein the illumination device comprises a detachable optical element configured to receive and to direct at least some of the artificial light leaving the illuminating body.

9. An illumination device according to claim 8 wherein the optical element comprises a variable lens element.

10. An illumination device according to claim 8 wherein the optical element comprises a reflector element detachably mounted to the illuminating body.

11. An illumination device according to claim 8, wherein the reflector element further comprises a mirror element covering the light extraction layer.

12. An illumination device according to claim 8, wherein the optical element comprises a condensor element, having a saw-tooth surface formation, forming a Fresnel-type lens.

* * * * *